United States Patent [19]

Edman et al.

[11] 4,186,855

[45] Feb. 5, 1980

[54] SPRAY PUMP ACTUATING AND BOTTLE HOLDING DEVICE

[75] Inventors: Walter W. Edman, Westport; Irving L. Farer, Rowayton, both of Conn.

[73] Assignee: Zotos International, Inc., Darien, Conn.

[21] Appl. No.: 916,928

[22] Filed: Jun. 19, 1978

[51] Int. Cl.[2] .............................................. G01F 11/02

[52] U.S. Cl. ...................................... 222/321; 222/472

[58] Field of Search ................... 222/321, 385, 402.15, 222/470, 472, 473, 474, 341, 323, 324

[56] References Cited

U.S. PATENT DOCUMENTS

| | | | |
|---|---|---|---|
| 4,089,440 | 5/1978 | Lee | 222/402.15 X |
| 4,124,148 | 11/1978 | Vieler et al. | 222/402.15 X |

*Primary Examiner*—Stanley H. Tollberg

*Attorney, Agent, or Firm*—Mattern, Ware, Davis & Stoltz

[57] ABSTRACT

By pivotally mounting a pump valve actuating lever to a bottle supporting handle assembly which is removably securable about the threaded portion of the bottle, a spray pump actuating and bottle holding device is achieved in which a plurality of product spray bursts are easily attainable in rapid succession without difficulty or user fatigue. Preferably, the pivot's axis of the actuating lever is located above and in front of the outlet orifice of the pump valve, in a manner which provides a force multiplying effect and allows the operator to use a gentle, light actuating touch to overcome the much higher actuating force requirement of the pump valve. In the preferred embodiment, the actuating lever also incorporates pump valve actuating fins which engage the pump valve and maintain the valve's nozzle orientation.

17 Claims, 8 Drawing Figures

FIG. 1
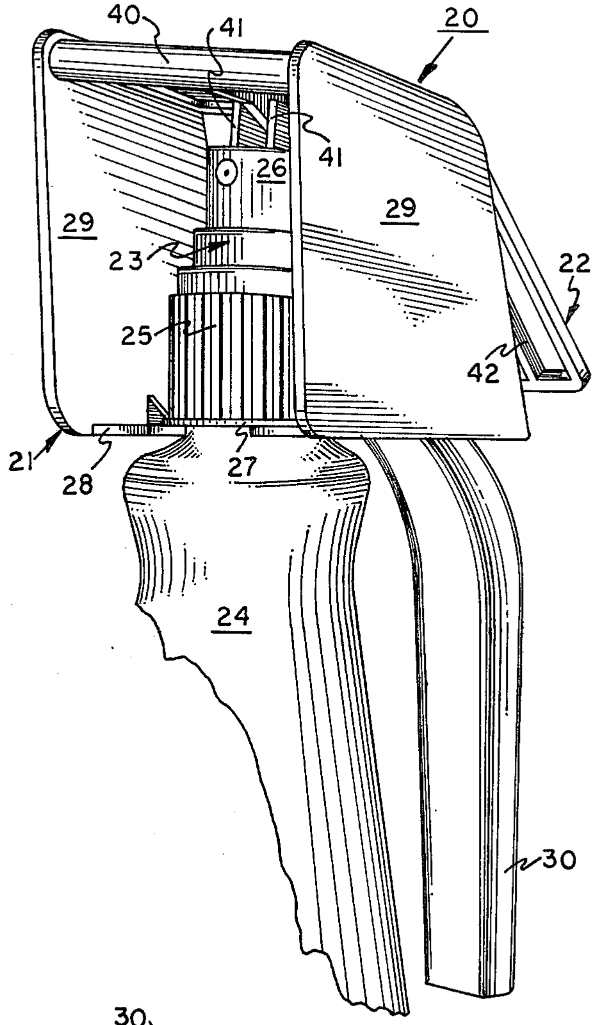
FIG. 2
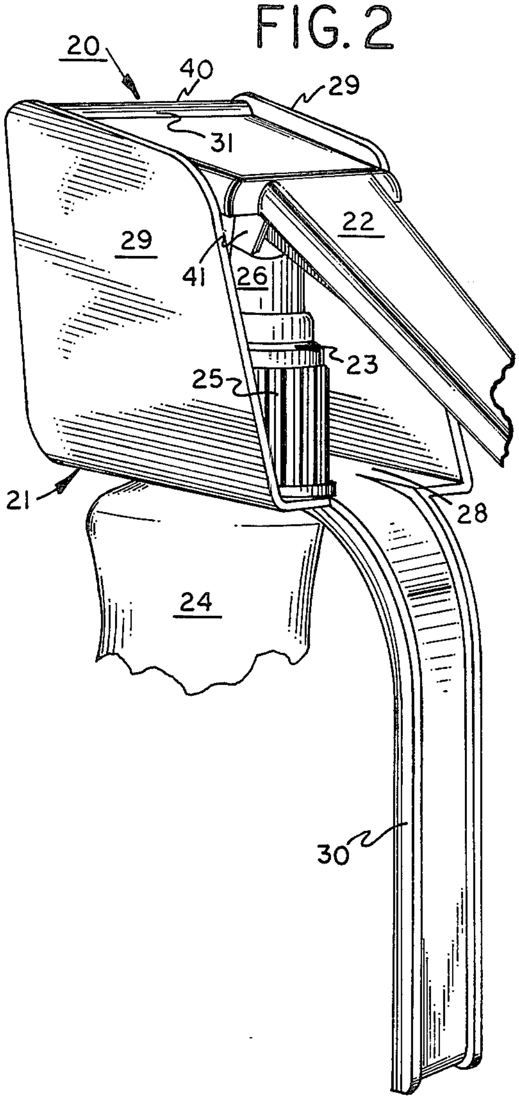
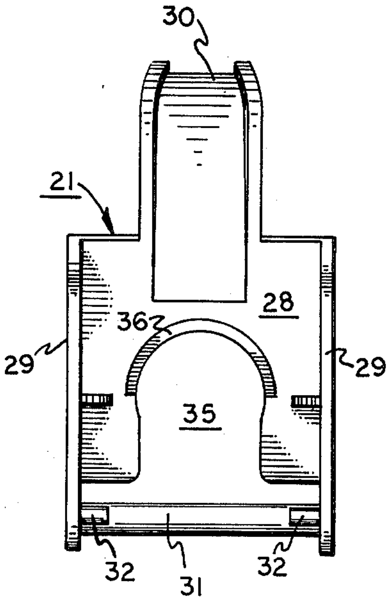
FIG. 3
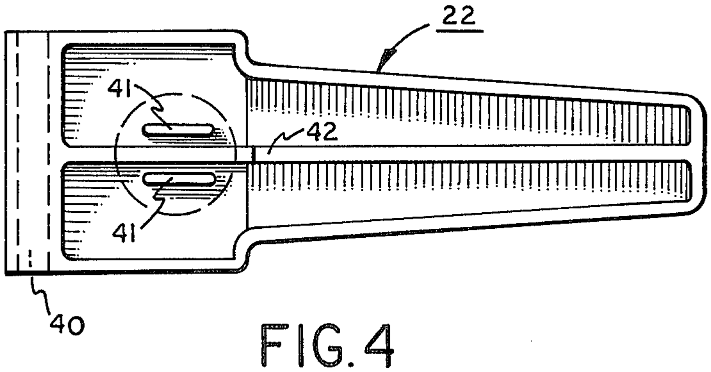
FIG. 4

SPRAY PUMP ACTUATING AND BOTTLE HOLDING DEVICE

BACKGROUND OF THE INVENTION

This invention relates to valve actuating and bottle holding devices, more particularly to valve actuating and bottle holding devices for use with pump-type valves.

Until recently, aerosols have been used almost exclusively for dispersing solutions of materials, or suspensions of finely ground solids, or liquid emulsions, all of which are generally referred to as liquid products throughout this specification. The development of aerosols was given tremendous impetus by discoveries made during World War II. This was due to several contributing factors, the most important of which was that a container with the solution could also contain a gas or a mixture of gases which could be liquified under a modest pressure. Thus, by slight pressure on a releasing valve, the gas would propel the liquid product through a directing outlet. The outlet often was an orifice designed to break up the liquid into fine droplets to form a mist.

Since aerosol dispensers became increasingly popular, many alternative devices were developed in order to increase the ease with which the finger-operated valve could be actuated. However, all of those devices were generally directed to a trigger-type actuating device.

The only prior art reference known to us which teaches a handle and actuating device, with the actuating member pivotally connected to the handle member, is Belpedio, U.S. Pat. No. 3,318,473, issued May 9, 1967.

In Belpedio, a wire handle is disclosed which incorporates a valve actuating member pivotally mounted forward of the handle. The actuating member also incorporates means for spreading the wire sides of the handle for engagement around the aerosol container. As will be clear from the following detailed description, the handle and actuating device of Belpedio is completely inapplicable for use with pump sprays, since the device of Belpedio would be both incapable of secure engagement about the pump spray as well as being completely unable to provide the necessary downward actuating force to the pump valve in order to achieve the desired spray mist.

Recently, aerosol containers have become increasingly unpopular due to the belief that the propellants in the aerosol container have an adverse effect upon the earth's ozone layer. Consequently, any research on improving pump-type valves received great impetus from the substantially increased demand for an effective pump-type valve. As is well known, a pump-type valve is employed by attaching the valve to a container of the liquid product. Then, by finger actuation of the pump valve system, the liquid product is discharged under pressure developed in the valve.

However, despite the improvements and developments resulting from the concentrated activity on pump-type valves, the manually operated pump valve requires the user's strength and dexterity in order to operate the valve properly. The requirement for strength and dexterity of the user is particularly acute when the liquid product must be delivered in a mist form with a droplet in the desirable range of 11 to 45 microns.

Strength is required in order to develop the necessary fast motion of the valve's finger-responsive actuator, which in turn develops the necessary pressure to deliver the liquid product to the finely constricted orifice. The orifice construction is used to "break up" the liquid into the desired spray mist. Consequently, not only must sufficient force be generated by the user, but also speed requiring dexterity is also necessary in order to achieve the desired spray mist.

Depending upon the particular liquid product being employed and the condition under which the product is being used, the ease of operating the pump-type valve becomes the most important factor. In particular, if the product to be used is a hair spray to give a coiffured hair a thin film of a cohesive polymer when dried, the pump-type valve must be activated usually 12 to 15 times in less than 10 seconds.

This requirement is extremely difficult, since many women do not have the strength and skill to achieve this speed with their index finger while holding the container with the thumb and other three fingers. Consequently, these female operators must depend upon the thumb of their strength to press the button, which makes it extremely awkward to hold the container and direct the mist to the desired areas.

Depending upon the size and shape of the container and the size of the operator's hand, extreme difficulty or complete inability may result when holding the bottle and operating the pump at the same time is attempted. In the professional field wherein a hair dresser must employ a hairspray product many times during a single day, these difficulties and problems become increasingly acute.

Therefore, it is a principle object of our invention to provide a pump-type valve actuating and bottle holding device which can be easily employed to securely hold the bottle and actuate the pump-type valve regardless of the size and shape of the hand of the operator.

Another object of the present invention is to provide a pump-type valve actuating and bottle holding device having the characteristic features defined above wherein the pump type valve is indirectly actuated with a minimum of force.

Another object of the present invention is to provide a pump-type valve actuating and bottle holding device having the characteristic features defined above which is removably mountable directly to the bottle and valve assembly, thereby allowing the actuating and holding device to be used repeatedly.

A further object of the present invention is to provide a pump-type valve actuating and bottle holding device having the characteristic features defined above which is lightweight as well as rigidly constructed and reinforced for maximum strength and long life.

Another object of the present invention is to provide a pump-type valve actuating and bottle holding device having the characteristic features defined above which enables a pump valve to achieve the ease, convenience and quality of the spray mist previously attainable only with an aerosol-type valve and container.

Another object of the present invention is to provide a pump-type valve actuating and bottle holding device having the characteristic features defined above which is inexpensive to manufacture and easy to assemble.

Other and more specific objects will in part be obvious and will in part appear hereinafter.

SUMMARY OF THE INVENTION

The present invention completely overcomes all of the prior art problems and difficulties found in using pump-type valve systems, by providing a structure which is removably mountable to the pump-type valve and bottle, incorporates both a bottle holding handle and a valve actuating lever, and is easily and comfortably hand-held and used. The valve actuating lever is pivotally mounted to a handle-supporting bottle engaging member and, in the preferred embodiment, incorporates a pivot axis located above and in front of the product delivery orifice of the pump valve. This construction assures the actuation of the pump-type valve with a minimum of user force.

In order to achieve a fine spray mist usable by a hairdresser or beautician, a pump valve requiring about eighty-five pounds of pressure for activation should be used. With the pump-valve actuating and bottle holding device of this invention, the operator attains as many blasts of the fine spray mist using an actuating force of about twenty to twenty-three pounds. As a result, the operator now easily achieves the required numerous blasts of a fine spray mist without difficulty and without finger fatigue.

The pump-type valve actuating and bottle holding device of the present invention also incorporate engagement means mounted to the handle supporting bottle engaging member and position for secure, locking engagement with the cap of the pump valve which is threadedly engaged with the bottle. In this way, the valve-actuating and bottle holding device of the present invention is quickly and easily secured to any pump-type valve mounted to a bottle, providing the desired bottle holding and valve actuating capability. Once the contents of the bottle have been used, the valve actuating and bottle holding device of the present invention can be easily removed and installed on another valve-bottle system.

In the preferred embodiment, the valve actuating and bottle holding device of the present invention also incorporates stop means formed along the pivot axis of the lever in order to prevent the actuating lever from being pivoted away from the handle beyond a particularly desired angular distance. In this way, the operator is assured that the actuating lever will always be within reach of the operator's thumb regardless of the position of the lever. Furthermore, the lever preferably incorporates valve actuating fin members extending from the lever into contact with the actuating button of the pump-type valve, with the fin members conforming to the general shape of the actuating button in order to assure secure inter-engagement therewith, as well as preventing the actuating button and orifice of the valve from rotating out of position.

The invention accordingly comprises an article of manufacture possessing the features, properties, and the relation of elements which will be exemplified in the article hereinafter described, and the scope of the invention will be indicated in the claims.

THE DRAWINGS

For a fuller understanding of the nature and objects of the invention, reference should be had to the following detailed description taken in connection with the accompanying drawings in which:

FIG. 1 is a front perspective view of the pump-type valve actuating and bottle holding device of the present invention shown mounted to a pump-valve and bottle system;

FIG. 2 is a rear perspective view of the pump-type valve actuating and bottle holding device of the present invention shown mounted to a pump-valve and bottle system;

FIG. 3 is a top plan view of the handle supporting bottle-engaging portion of the pump-type valve actuating and bottle holding device of the present invention;

FIG. 4 is a bottom plan view of the lever portion of the pump-type valve actuating and bottle holding device of the present invention;

DETAILED DESCRIPTION

Figure 6:
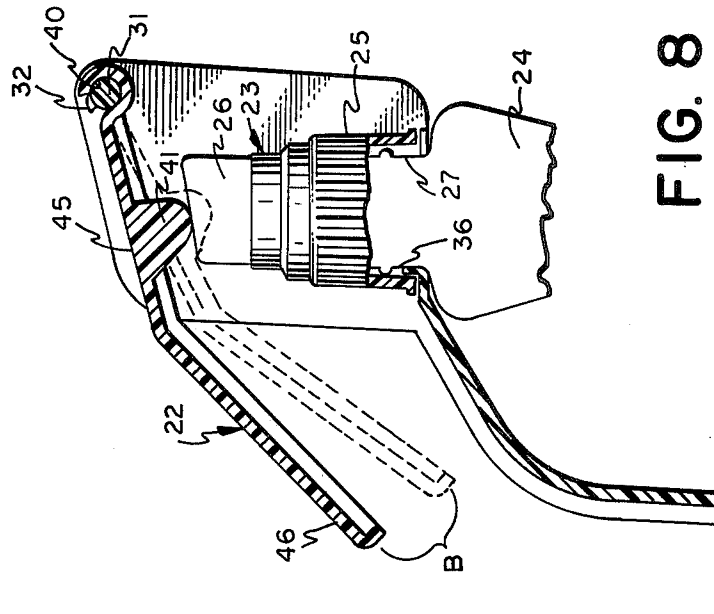
FIGS. 5 and 6 are cross-sectional side elevation views, partially broken away, of alternative embodiments of the pump-type valve actuating and bottle holding device of the present invention, shown secured between a pump-type valve and a bottle with which the valve is threadedly engaged.

In FIGS. 1 and 2, the pump-type valve actuating and bottle holding device 20 of the present invention is shown mounted in position on a bottle 24 having a pump-type valve 23 threadedly engaged therewith. Valve actuating and bottle holding device 20 preferably incorporate two major portions, a handle supporting bottle engaging member 21 and a valve actuating lever 22 pivotally engaged with member 21. Preferably, both lever 22 and handle supporting bottle engaging member 21 are constructed from molded plastic, with reinforcing ribs where necessary, in order to assure a strong and inexpensive construction which is also lightweight.

Throughout this specification, pump valve 23 will be discussed as comprising an internally threaded cap 25 and a spray-initiating plunger 26. Also, bottle 24 will be discussed along with threaded neck portion 27 thereof, with which cap 25 is threadedly engaged.

As shown in FIGS. 1, 2, and 3, handle supporting bottle engaging member 21 comprises a bottle surrounding surface 28 having removably securable mounting means, substantially vertical side walls 29 extending upwardly from bottle surrounding surface 28, a handle 30 extending outwardly and downwardly from bottle surrounding surface 28 to a position substantially parallel to a portion of bottle 24, and a pivot pin 32 extending between side walls 29. In the preferred embodiment, the entire bottle engaging and holding member 21 comprises a single, unitary, molded article.

Pivot Pin

In the preferred embodiment, pivot pin 31 comprises a substantially cylindrically shaped rod extending between and integrally connected with side walls 29. Pivot pin 31 forms the pivot axis for lever 22. Although pin 31 could be manufactured as a separate piece and mounted between side walls 29, pivot pin 31 is preferably manufactured as an integral molded portion of the entire member 21, with sufficient thickness to assure its continuous and problem-free operation as the pivot axis for lever 22. Furthermore, the thickness of pivot pin 31 provides added strength to member 21 and, in the preferred embodiment, comprises a diameter of about 3/16 inches.

Pivot pin 31 also incorporates radially extending projections 32 which extend beyond the outer diameter of pivot pin 31. Projections 32 perform as positive stops to limit the arcuate travel of lever 22 when pivotally engaged with pivot pin 31. As is more fully discussed below, the angular limitation of lever 22 provides assurance that the operator will be able to reach lever 22 while securely holding the bottle with handle 30. Although various alternative structures could be employed as stop means, such as longitudinal bars, projections 32 are preferred.

The physical position of pivot pin 31 relative to valve 23 is extremely important to the efficient operation and actuation ease of valve actuating lever 22. Referring to FIGS. 1, 2, 5, and 6, it is readily seen that pivot pin 31 is located between side walls 29 at a position spaced above and in front of pump valve 23.

In the preferred embodiment, pivot pin 31 is positioned about ⅝ inches above the top of valve 23 and about ¾ inches forward of the central axis of valve 23. With the pivot axis of lever 22 having this preferred position, coupled with the preferred construction of lever 22, the operator is assured that any actuating force by the operator on lever 22 will produce an actuating force on pump valve 23 which is an increased multiple of the operator initiated force, with substantially the entire increased force acting directly upon pump valve 23. The actual operation and force multiplying characteristics attained by the valve actuating and bottle holding device 20 of the present invention will become more clearly apparent from the discussion below concerning the operation of device 20.

Mounting Means

Another important element of the handle supporting, bottle engaging member 21 is the removably securable mounting means incorporated therein for cooperative engagement with valve 23 and bottle 24. In the preferred embodiment, the removable, securable mounting means comprises elongated open-ended slot 35 and upturned flange or collar 36, both of which are formed in bottle surrounding surface 28, the construction and operation of which is best understood by referring to FIGS. 1, 3, 5 and 6.

Preferably, the width of open-ended slot 35 is slightly greater or about equal to the outer diameter of threaded neck portion 27 of bottle 24. This assures that bottle surrounding surface 28 will be slidably engageable with the threaded neck portion of bottle 24, with snug interconnection therewith.

In order to assure and enhance the snug fitting engagement between bottle engaging surface 28 and threaded neck portion 27, slot 35 incorporates a rounded rear portion having a diameter slightly greater than the entrance width of slot 35. In this way, neck portion 27 will be held in engagement with the rounded rear portion of slot 35, while the smaller width entrance portion of slot 35 helps to prevent dislodgement of neck portion 27 from the rounded rear portion. In the preferred embodiment, slot 35 has an entrance width of about 0.74 inches and the rounded rear portion of slot 35 has a diameter of about 0.77 inches.

Figure 5:
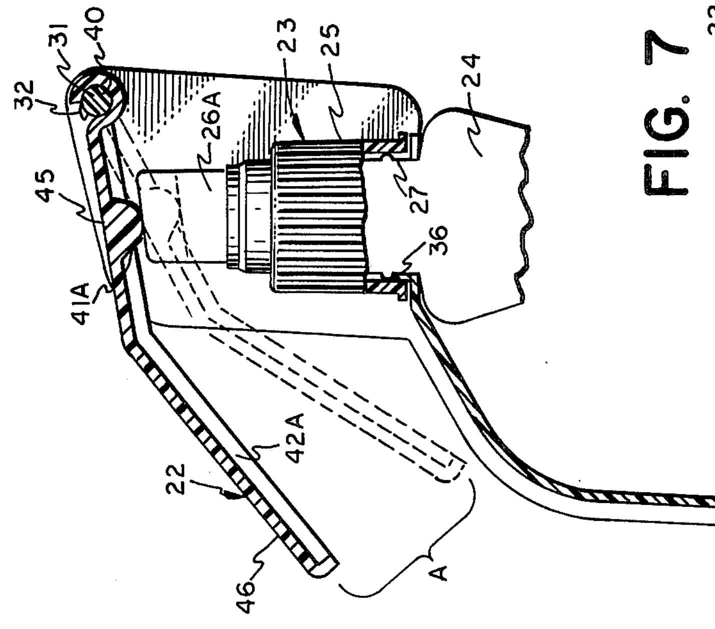

In order to provide and assure captured interconnected engagement with bottle 24 and valve 23, bottle surrounding surface 28 incorporates an upturned flange or collar 36 positioned about the rounded portion of slot 35 conforming to the outer diameter of threaded neck portion 27 of bottle 24. As best seen in FIGS. 5 and 6, flange 36 comprises a height which is less than the distance from the base of neck portion 27 with bottle 24 to the first thread formed about neck portion 27. With this construction and with rounded flange 36 having a diameter substantially just slightly greater than the outer diameter of neck portion 27, flange 36 is securely lockable between neck portion 27 of bottle 24 and threaded cap 25 of valve 23.

Furthermore, the width or thickness of flange 36 is less than the depth of the threads on neck portion 27 of bottle 2, or less than the distance between the outer diameter of neck 27 and the inner diameter of cap 25. This assures that cap 25 will be able to lockingly engage flange 36 and provide the desired secured engaged attachment thereto. Furthermore, this construction also assures that cap 25 is completely engaged with bottle 24, thereby eliminating accidental spillage of the contents of bottle 24 if bottle 24 were to be knocked over.

Valve actuating and bottle holding device 20 of this invention is securely lockingly engaged in position about the threaded neck portion of bottle 24 by unthreading cap 25 of valve 23 a sufficient distance to expose the lower section of neck portion 27. Then, handle supporting, bottle engaging member 21 is positioned about threaded neck portion 27 by sliding threaded neck portion 27 through open slot 35 until upturned flange 36 abuttingly engages the lower surface of threaded neck portion 27.

Device 20 is then securely locked in position by returning threaded cap 25 to its full threadedly engaged position with neck 27 of bottle 24. Once cap 25 has been completely threaded onto neck portion 27 of bottle 24, valve actuating and bottle holding device 20 of the present invention is securely held in its locked position ready for supportingly holding bottle 24 with handle 30, as well as easily and efficiently activating valve 23 with easily movable lever 22.

Handle

In order to provide a valve actuating and bottle holding device 20 which is universally comfortable regardless of hand sizes and shapes, the particular construction and position of handle 30 are important factors. In the present invention, the construction of handle 30 allows any adult hand to firmly grip the handle, as well as easily controllably move lever 22.

A universally employable and universally comfortable handle 30 is achieved by constructing handle 30 to extend outwardly from the rear edge of bottle surrounding surface 28 and then curve downwardly at substantially a right angle thereto. As clearly shown in FIGS. 1, 2, 5 and 6, the substantial right angle relationship between handle 30 and bottle surrounding surface 28 is formed in a smooth continuous curve, thereby imparting strength and rigidity to this area.

Furthermore, the substantially right angular relationship between handle 30 and bottle surrounding surface 28 is important since this construction assures that the center of gravity of bottle 24 when mounted thereto is vertically downward from the top of the curve of handle 30. The location of the center of gravity of bottle 24 in relationship to handle 30 is extremely important, and the present construction provides the center of gravity at the location where the second joint of the index finger of the operator's hand will be positioned. In this way, the weight of the bottle will be most comfortably and most easily supported.

To further enhance the comfort and strength of handle 30, handle 30 is channeled and incorporates smoothly rounded surfaces along its entire length in the areas with which the operator's hand will contact. In this way, comfort and strength are assured.

The universal applicability and usability of handle 30 is achieved by manufacturing handle 30 with a width of between ½ inch and 1 inch and an overall length of between 3 inches and 5 inches. In the preferred embodiment, handle 30 comprises a width of about ¾ inch and a length of about 4 inches. It has been found that with these dimensional limitations, virtually any size hand can comfortably hold handle 30 and employ valve actuating and bottle holding device 20 of the present invention.

Valve Actuating Lever

Valve actuating lever 22 preferably comprises a single molded plastic unitary structure having an overall length of about four inches. As shown in FIGS. 1, 2, 4, 5, and 6, lever 22 incorporates a pivot pin receiving channel 40 formed at one end thereof for secure, snapping, locked inter-engagement with pivot pin 31. When pin receiving channel 40 is interlocked about pivot pin 31, channel 40 substantially peripherally surrounds pivot pin 31 and provides lever 22 with free arcuate movability about the central axis of pivot pin 31 within the limitations established by projections 32.

Lever 22 also incorporates valve engaging fins 41, which extend outwardly from the bottom surface of lever 22 and directly engage plunger 26 of pump type valve 23. Preferably, fins 41 are shaped to engage the top surface of plunger 26 and maintain plunger 26 in the desired orientation.

Typical pump-type valves 23 found in the prior art generally incorporate plungers 26 having curved indentations formed in the top surface of plunger 26. These curved indentations are designed to fit the index finger or the thumb of the operator, as well as being angularly pitched so as to designate the location of the orifice formed in plunger 26.

Figure 8:
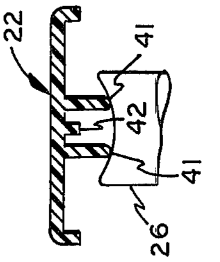
FIG. 8 is a cross-sectional front elevation view, partially broken away, taken along line 8—8 of FIG. 6.

Extension fins 41 of lever 22 are constructed to engage the curved indentation of plunger 26 as well as substantially conform to the finger curvature at the particular nozzle defining angle employed in plunger 26. In this way, extension fins 41 not only securely engage plunger 26 for direct and complete and vertical actuation thereof, but also securely engage the curve shape of the top of plunger 26, thereby preventing any possible rotation of the nozzle of plunger 26 out of the desired forward position. This construction can best be seen in FIGS. 6 and 8.

Alternatively, a single projection can be formed in the base of lever 22 having a shape substantially equivalent to an eliptical ball, or any other similar shape which would conform to the finger indentation of plunger 26. However, it has been found that extension fins provide the desired plunger controlled engagement and rotation prevention necessary for effective operation of lever 22.

Lever 22 also incorporates a strengthening rib 42 which longitudinally extends along the underside of lever 22. Preferably, longitudinal rib 42 extends the entire length of lever 22 in a substantially central position.

As best seen in FIGS. 5 and 6, lever 22 comprises a forward valve contacting section 45 and a rear finger contacting section 46. Sections 45 and 46 are angularly disposed to each other, and in the preferred embodiment, sections 45 and 46 define an included angle of 150° between the bottom surfaces thereof.

Although the included angle between sections 45 and 46 of lever 22 can be altered, and the position of pivot pin 31 and the particular length of extension fins 41 can be changed, it is important to know that in the preferred construction of valve actuating and bottle holding device 20, section 46 of lever 22 is positioned about 1½ inches above the curved portion of handle 30, with section 46 sloping at about a 45° angle from the vertical. In this way, it has been found that valve actuating and bottle holding device 20 achieves universality with small to large adult hands being able to comfortably grip and operate device 20. Consequently, if any dimensional changes are made, compensating changes should be made elsewhere in order to maintain the overall lever spacing and angular slope substantially constant.

Operation and Alternative Embodiments

Referring to FIGS. 5, 6, 7 and 8, the operation of valve actuating and bottle holding device 20 will best be understood as well as the precise construction of fins 41 of lever 22 for alternative pump-type valve constructions.

Since valve actuating and bottle holding device 20 is constructed for use with only pump-type valves, it is important to note that the various types of pump-type valves can be classified into two major categories, namely, long plunger valves and short plunger valves. In FIG. 5, pump-type valve 23 incorporates a long plunger 26A, while in FIG. 6 pump-type valve 23 is shown with a short plunger 26. Since pump-type valve 23 shown in FIGS. 1 and 2 is shown for exemplary purposes with short-type plunger 26, the same numerical references have been incorporated into FIG. 6.

It has been found that regardless of which plunger-type valve is employed, the preferred embodiment of valve actuating and bottle holding device 20 of the present invention should employ an activation stroke of about one inch. In this way, regardless of the vertical travel, plunger 26 or 26A must make in valve 23 in order to achieve the desired spray mist, lever 22 is constructed to achieve the required activation travel with thumb controlling section 46 moving about one inch between its unactuated and fully actuated positions. With this construction, any adult's hand can easily hold valve actuating and bottle holding device 20, as well as bottle 24 and the product contained therein using the individual's four fingers, and easily reach lever 22 with the thumb and manipulate lever 22 to produce the desired spray mist in any necessary repeat fashion.

Figure 7:
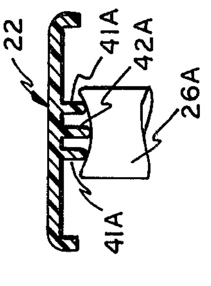
FIG. 7 is a cross-sectional front elevation view, partially broken away, taken along line 7—7 of FIG. 5.

In order to assure the proper positioning of lever 22 as well as the controlled engagement of plunger-type valve 23 when long plunger 26A is employed, it has been found that extension fins 41A preferably comprise short, fins with rounded ends, with strengthening rib 42A extending from the rear surface of lever 22 substantially the same distance as fins 41A, as shown in FIG. 7. In this way, fins 41A and rib 42A securely engage the finger indentation formed in the top of plunger 26A, providing assurance that plunger 26A will not rotate about its central axis and that the orifice formed therein will be maintained in the forward facing direction.

In the preferred embodiment, fins 41A and fins 41 incorporate rounded ends having substantially identical radii of curvature, since the indentations formed in their respective plungers are substantially identical. In the preferred embodiment, fins 41 and 41A incorporate rounded ends having a radius of curvature of about 3/16 inches. The only variation between the two embodiments is that fins 41A, which are used with long plunger 26A of FIG. 5, have the axis of the radius of curvature positioned at about 0.09 inches from the top surface of section 45 of lever 22. In the alternative construction of fin 41 for use with short plunger 26, the same radius of curvature of 3/16 inches is used for the terminating ends of fins 41, but the central axis for this radius of curvature is preferably located at about ¼ inches from the top surface of section 45 of lever 22.

In this way, the position of finger-engaging section 46 of lever 22 is maintained at about 1½ inches above the curvature of handle 30, as well as being held at about an angle of 45° with the vertical. With these preferred structural dimensions, valve actuating and bottle holding device 20 achieves true universality for all adult hand sizes and shapes. However, although various changes can be made to these dimensional limitations without departing from the scope of this invention, it is preferred that the changes be balanced to maintain lever 22 in an easily reached position above the handle and at a convenient and comfortable slope.

In many applications, such as in providing a plurality of bursts of a fine spray mist for use in giving coiffured hair a thin film of a cohesive polymer, it is necessary to employ a high compression pump-type spray valve. Since high compression pump-type spray valves generally require up to about 85 pounds per square inch precompression pressure before the spray is delivered, the repeated and continuous use of these types of valves becomes very difficult. The necessity for a plurality of bursts of fine spray mist in a relatively short time presents a serious problem with these types of valves, since 85 pounds per square inch is about the maximum pressure level for comfortable finger actuation.

By employing valve actuating and bottle holding device 20 of the present invention, it has been found that the actuation force required by the operator is reduced to about one-fourth the actuation pressure necessary for the valve itself. In this way, the entire spraying procedure is easily accomplished without tiring and with even larger containers being easily and comfortably held by the user. Furthermore, it has been found that 30–35 individual bursts of the required fine spray mist can be comfortably obtained within 10 seconds, with the user never experiencing any finger fatigue. In fact, by using valve actuating and bottle holding device 20 to activate a high compression pump-type valve, the user is able to obtain a vapor-like mist at a smooth, continuous rate, heretofore only obtainable with aerosol type spray systems.

In order to obtain a single burst of a fine spray mist using the valve actuating and bottle holding device 20 of the present invention, the user merely comfortably grasps handle 30 with his four fingers, allowing the second joint of the index finger of the operating hand to rest against the upper curved portion of handle 30. With valve actuating bottle holding device 20 having the construction and general dimensional limitations discussed above, the center of gravity of the entire container will be located substantially along this curved portion of handle 30, thereby allowing the user to easily and comfortably support the entire weight of the container by simply holding the handle in a normal and comfortable position.

Furthermore, with lever 22 having the construction discussed above and pivotally engaged with pivot pin 31 in the preferred location above and in front of the pump valve, the thumb engaging portion 46 of lever 22 will be located no greater than 1½ inches above the curved portion of handle 30. In this way, the user easily and comfortably engages portion 46 of lever 22 with the thumb of the operating hand, and controllably actuates valve 23.

In order to produce a burst of product in a fine spray mist from valve 23, the operator merely presses thumb engaging portion 46 of lever 22 with the thumb of the operating hand with a quick downward movement. The downward movement causes valve engaging fins 41 of lever 22 to force plunger 26 of valve 23 vertically downward, thereby producing the desired burst of product in a fine spray mist. The final downward position of lever 22, plunger 26, and plunger 26A are shown in phantom in FIGS. 5 and 6.

Once lever 22 has been pressed downwardly to cause plunger 26 or 26A of valve 23 to be moved vertically downwardly to its fully contracted position, the operator removes any downward pressure from lever 22 allowing the internal spring in valve 23 to push both plunger 26 or 26A and lever 22 upwardly to its initial position.

In the embodiment of FIG. 5, wherein long plunger 26A is represented, lever 22 travels a distance "A" in order to fully compress plunger 22A and produce the desired fine spray mist. In the preferred embodiment, travel distance "A" is 1.06 inches. In the embodiment shown in FIG. 6, where short plunger 26 is represented, lever 22 travels a distance "B" in fully activating valve 23, with travel distance "B" being equal to about 0.6 inches.

Due to the different sized plungers employed in the major categories of pump-type valves, different travel distances are required for lever 22 in order to fully activate the valve and produce the desired burst of product in a fine spray mist. However, as can be seen from the above description, lever 22 in these two embodiments is constructed to provide an activation stroke which is not greater than the maximum desired travel of 1.5 inches. Preferably, a travel distance of about one inch is maintained in order to assure that lever 22 will produce the burst of fine spray mist with a quick, easy, and relatively short stroke cycle.

As discussed above, the various dimensional limitations detailed throughout the specification are preferred in order to achieve the combination and interaction of features thoroughly disclosed above. Although various changes can be made in these dimensional limitations, it is important to note that lever arm 22, constructed as disclosed above, with a pivot axis located about ¾ inches above valve 23 and ¾ inches in front of the central axis of valve 23, establishes a lever 22 which operates as a bell crank. In this way, the angularly skewed force introduced on thumb engaging portion 46 of lever 22 by the operator's thumb is converted into a maximum vertical force acting directly on the plunger of valve 23.

Furthermore, the lever construction of the present invention provides a force multiplying effect which allows the operator to use a gentle light touch near the end of the lever to fully activate the high compression pump-type valve, which requires a substantially greater vertical activation force than is provided by the operator. In the preferred embodiment for short plunger valves, shown in FIG. 6, this force multiplying effect is assured with the central axis of the radius of curvature of the end of fin 41 position about 31/32 inches from the pivot axis of lever 22. With long plunger valves, shown in FIG. 5, the force multiplying effect is preferably provided by positioning the central axis of the radius of curvature for the end of 41A a distance of about 27/32 inches from the pivot axis of lever 22.

Consequently, although various changes can be made in the valve actuating bottle holding device of the present invention, without departing from the scope of this invention, it is important to maintain the mechanical advantages achieved by the construction of device 20 as detailed above. Without these mechanical advantages, the efficacy of valve actuating and bottle holding device will be substantially reduced or even lost.

It will thus be seen that the objects set forth above, among those made apparent from the preceding description, are efficiently attained and, since certain changes may be made in the above article without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A pump valve actuating and bottle holding device removably mountable to a bottle having a pump-type spray valve threadedly engaged therewith, said device comprising:
(A) mounting means removably engageable with the threaded cap of the valve for secure interconnection therewith when the cap is threadedly engaged with the bottle and incorporating
  (a) means forming a bottle neck portion entry and holding zone, comprising a front entry portal zone formed therein, for easy, slide-on mounting of said pump valve actuating and bottle holding device on the bottle without requiring removal of the pump spray valve threadedly engaged with the bottle, and
  (b) an upturned flanged member positioned about the neck portion entry and holding zone for cooperative interengagement between the lower section of the bottle neck portion and the lower section of the threaded cap of the valve;
(B) a bottle supporting handle cooperatively associated with the mounting means; and
(C) a pump actuating lever,
  (a) pivotally mounted in juxtaposed spaced relationship to the handle and the pump valve of the bottle,
  (b) incorporating valve actuating means positioned for direct actuating contact of the valve, and
  (c) easily movable between a first valve raised position and a second valve actuated position, whereby simple downward movement of the lever causes the pump valve to produce a burst of product in a fine spray mist with the lever being returned to its first position through the return action of the valve.

2. The pump valve actuating and bottle holding device defined in claim 1, wherein said device further comprises:
(D) a bottle engaging surface;
(E) supporting arms extending upwardly from opposed sides of the bottle engaging surface; and
(F) a single, elongated, continuous, pivot pin
  (a) extending between the supporting arms, and
  (b) positioned with the central axis thereof extending substantially perpendicular to the central axis of the valve in a plane spaced in front of the central axis of the valve and above the nozzle of the valve.

3. The valve actuating and bottle holding device defined in claim 2, wherein the mounting means, the handle, the bottle engaging surface, the pin support arms, and the pivot pin are all formed in a single unitary structure.

4. The valve actuating and bottle holding device defined in claim 2, wherein said pump actuating lever is further defined as being rotationally engaged with the pivot pin and the pivot pin is further defined as being non-rotationally mounted to the support arms and incorporating stop means formed thereon to limit the arcuate movement of the pump actuating lever.

5. The valve actuating and bottle holding device defined in claim 4, wherein the central axis of the pivot pin is further defined as being $\frac{3}{4}$ inches above the nozzle of the valve, and $\frac{3}{4}$ inches in front of the central axis of the valve.

6. The valve actuating and bottle holding device defined in claim 1, wherein said means forming a bottle neck portion entry and holding zone is further defined as comprising:
(1) a front entry portal zone dimensioned to be substantially identical to the diameter of the bottle neck portion; and
(2) a rear holding zone
  (i) interconnected with the front entry portal zone, and
  (ii) having a substantially curved shape with a diameter slightly greater than the diameter of the bottle neck portion; and the upturned flange is positioned peripherally defining the curved section forming the rear holding zone.

7. The valve actuating and bottle holding device defined in claim 1, wherein said upturned flange is further defined as comprising:
(1) a height less than the distance from the base of the bottle neck portion to the first thread formed thereon, and
(2) a thickness less than the distance between the outer diameter of the bottle neck portion and the inner diameter of the threaded cap of the valve.

8. The valve actuating and bottle holding device defined in claim 1, wherein said handle is further defined as being unitarily formed with the mounting means and extending therefrom rearwardly and vertically downward in a smooth continuous curve, forming a substantially 90° angular bend.

9. The valve actuating and bottle holding device defined in claim 8, wherein said handle is further defined as comprising a width of between about one-half and one inches and a length of between about three and five inches.

10. The valve actuating and bottle holding device defined in claim 9, wherein said handle is further defined as comprising a width of about $\frac{3}{4}$ inches and a length of about 4 inches.

11. The valve actuating and bottle holding device defined in claim 1, wherein the pump actuating lever further comprises:
(d) a first valve engaging portion, and
(e) a second thumb engaging portion, said portions being angularly disposed to each other with an included angle of about 150°.

12. The valve actuating and bottle holding device defined in claim 11, wherein said valve actuating means of said pump actuating lever is further defined as comprising:

(1) at least one extension fin mounted to the bottom surface of the valve engaging portion and incorporating a rounded end shaped for conforming interengagement with the top surface of the valve.

13. The valve actuating and bottle holding device defined in claim 12, wherein said rounded end of the fin is further defined as comprising a radius of curvature of about 3/16 inches.

14. The valve actuating and bottle holding device defined in claim 13, wherein said device is used for activation of pump-type valves having a short plunger, and the rounded end of the fin is further defined as having the center point of its radius of curvature positioned ¼ inches from the top of the valve-engaging portion, and about 31/32 inches from the pivot axis of the lever.

15. The valve actuating and bottle holding device defined in claim 13, for use with pump-type valves having a longer plunger, wherein the rounded end of the fin is further defined as having the central axis of its radius of curvature located at about 29/32 inches from the top surface of the valve-actuating portion, and about 27/32 inches from the pivot axis of the lever.

16. The valve actuating and bottle holding device defined in claim 1, wherein the pump-actuating lever is further defined as (d) being pivotally mounted above the handle, and (e) having a thumb controlled portion spaced within 2 inches of the handle at an angular slope of about 45° with the vertical.

17. The valve actuating and bottle holding device defined in claim 1, wherein said pump-actuating lever is further defined as comprising:

d. a reinforcing rib longitudinally extending substantially the entire length thereof, providing added strength and rigidity thereto.

* * * * *